United States Patent [19]

O'Donohue

[11] Patent Number: 4,617,447
[45] Date of Patent: Oct. 14, 1986

[54] DRIVE ASSEMBLY FOR DRAWING A MOVABLE WELDING CARRIAGE AND METHOD OF WELDING

[75] Inventor: William T. O'Donohue, Shorewood, Ill.

[73] Assignee: Caterpillar Inc., Peoria, Ill.

[21] Appl. No.: 707,356

[22] Filed: Mar. 1, 1985

[51] Int. Cl.⁴ .............................................. B23K 9/12
[52] U.S. Cl. ............................ 219/124.31; 219/130.51; 219/136; 219/137.7
[58] Field of Search ............. 219/124.31, 137.7, 125.1, 219/136, 124.22, 124.1, 125.11, 130.51; 228/32, 45

[56] References Cited

U.S. PATENT DOCUMENTS

| | | | |
|---|---|---|---|
| 3,718,798 | 2/1973 | Randolph et al. | 219/60 A |
| 3,764,777 | 10/1973 | Sakabe et al. | |
| 3,849,626 | 11/1974 | Linam et al. | 219/125.1 |
| 3,898,419 | 8/1975 | Smith | 219/137.7 |
| 3,930,137 | 12/1975 | Iizuka et al. | 219/124.1 |
| 3,930,138 | 12/1975 | Knidstrom et al. | 219/126 |
| 4,133,469 | 1/1979 | DeSaw | 219/124.31 |
| 4,371,107 | 2/1983 | Watanabe et al. | 228/32 |
| 4,404,455 | 9/1983 | Gotoh | 219/124.34 |

*Primary Examiner*—Clifford C. Shaw
*Attorney, Agent, or Firm*—Robert A. McFall

[57] ABSTRACT

An automatic welding apparatus includes a drive assembly for pulling a movable carriage along a weld joint by drawing a weld cable through the drive assembly. The weld cable is attached to a welding nozzle adjustably mounted on the carriage.

A method of welding a weld joint using the automatic welding apparatus includes moving the carrier and the attached nozzle by moving the carrier and nozzle along the joint by pulling the cable in a direction substantially parallel to the joint.

The present invention is particularly useful in arc welding applications where access to the weld joint is restricted or hindered.

11 Claims, 9 Drawing Figures

FIG-5

FIG-6

DRIVE ASSEMBLY FOR DRAWING A MOVABLE WELDING CARRIAGE AND METHOD OF WELDING

DESCRIPTION

1. Technical Field

This invention relates generally to an automatic welding apparatus and method and more particularly to such an apparatus and method for welding in which a carriage having a weld nozzle mounted thereon is controllably moved along a predetermined path.

2. Background Art

Automatic welding processes which allow the complete welding process to be preformed without constant operator control, are becoming increasingly important to industry. In high volume operations, automatic welding generally provides a high quality weld at greatly reduced cost. Devices to carry out automatic welding can be categorized in three broad groups; computer-controlled robots and welding machines, self-powered movable welding platforms, and externally driven movable welding platforms.

Robot-mounted welding guns and dedicated welding machines are the most complex and sophisticated group of welding devices. Not only are these devices computer-controlled but they also generally include one or more feedback sensing devices to adaptively alter selected welding parameters and compensate for variations in weld joint position and geometry. These welding devices are generally quite large and expensive, and they require that the workpieces be mounted and located in specifically designed jigs and fixtures.

Self-powered movable welding devices are useful in particular applications. For example, U.S. Pat. No. 3,718,798 to James B. Randolph et al, describes a welding apparatus mounted on a self-powered carriage. The carriage is adapted to ride on, and be guided by, a flexible track member. Similar devices are shown in U.S. Pat. Nos. 3,764,777, 4,371,107, and 4,404,455. These devices, in general, have a greater degree of portability and lower cost than the robot or machine mounted welding devices. All of the self-powered welding devices are moved along their respective paths by traction generated between powered drive rollers and a stationary surface such as the workpiece or a guide rail. Consequently, any impediment that could cause slippage between the drive roller and the stationary surface will directly influence the relative movement of the carriage-mounted welding device. If variations in travel speed occur during the welding operation, uneven joint fill will occur, resulting in over-fill of the joint or burn-through of the parent workpieces.

Externally driven welding platforms overcome the traction drive slippage problems of the self-powered welding devices. However, heretofore the externally driven units have been encumbered by mechanical linkages between the drive unit and the welding head. For example, U.S. Pat. No. 3,930,138 to Karl-Erik Knipstrom et al, describes an apparatus for welding vertical joints in which a pair of movable shoes contain the weld puddle and are mounted on a threaded guide member. The shoes move along the joint in response to rotation of the guide member. However, the threaded guide member is prone to jamming or binding as a result of weld spatter and dirt particles which may be deposited on the threaded surface. Other mechanical drive linkages present similar problems. In addition, mechanical drive linkages are generally awkward to set up and difficult to operate, particularly in applications where access to the weld joint is limited or restricted.

The present invention is directed to overcoming one or more of the problems set forth above. In particular, a welding apparatus embodying the present invention includes a compact movable carriage on which a welding nozzle is mounted, and a remote drive assembly for moving the carriage and nozzle by pulling the cable. The welding apparatus is portable, economical to produce, and is able to reach into heretofore inaccessible locations and automatically weld along a preselected joint.

DISCLOSURE OF THE INVENTION

In accordance with one aspect of the present invention an apparatus for welding includes a movable carriage and a drive unit. The drive unit moves the carriage by pulling on a supply cable attached to a welding nozzle assembly mounted on the carriage, and includes contact means for engaging the cable and means for moving the contact means to move the cable.

In another aspect of the present invention, a method of welding using a welding nozzle having an attached supply cable includes mounting the nozzle on a carrier, positioning the carrier adjacent a joint to be welded, and moving the carrier and the weld nozzle along the joint by pulling the cable in a direction substantially parallel to the joint.

Other features of the welding apparatus include control of the travel speed of the carrier, and selective operation in a continuous or in an intermittent welding mode. In the latter mode the length of the weld and the length of the skip interval between welds are selectively and separately controllable. Still further, the weld and skip mode carrier travel speeds are independently adjustable to provide separate control over the weld operating mode for optimum groove fill rates and the non-weld or skip mode travel rates for faster carriage travel and improved operating cycle time.

BEST MODE FOR CARRYING OUT THE INVENTION

Figure 1:
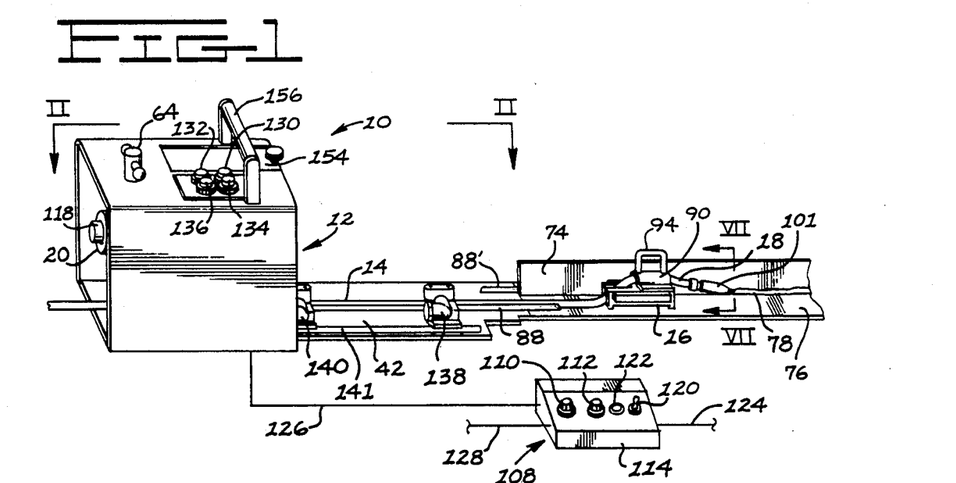
FIG. 1 is a perspective view of an automatic welding apparatus embodying the present invention, FIG. 2 on sheet 2 of the drawings is a shortened plan view of a drive assembly for the welding apparatus embodiment taken along the lines II—II of FIG. 1.
Figure 2:
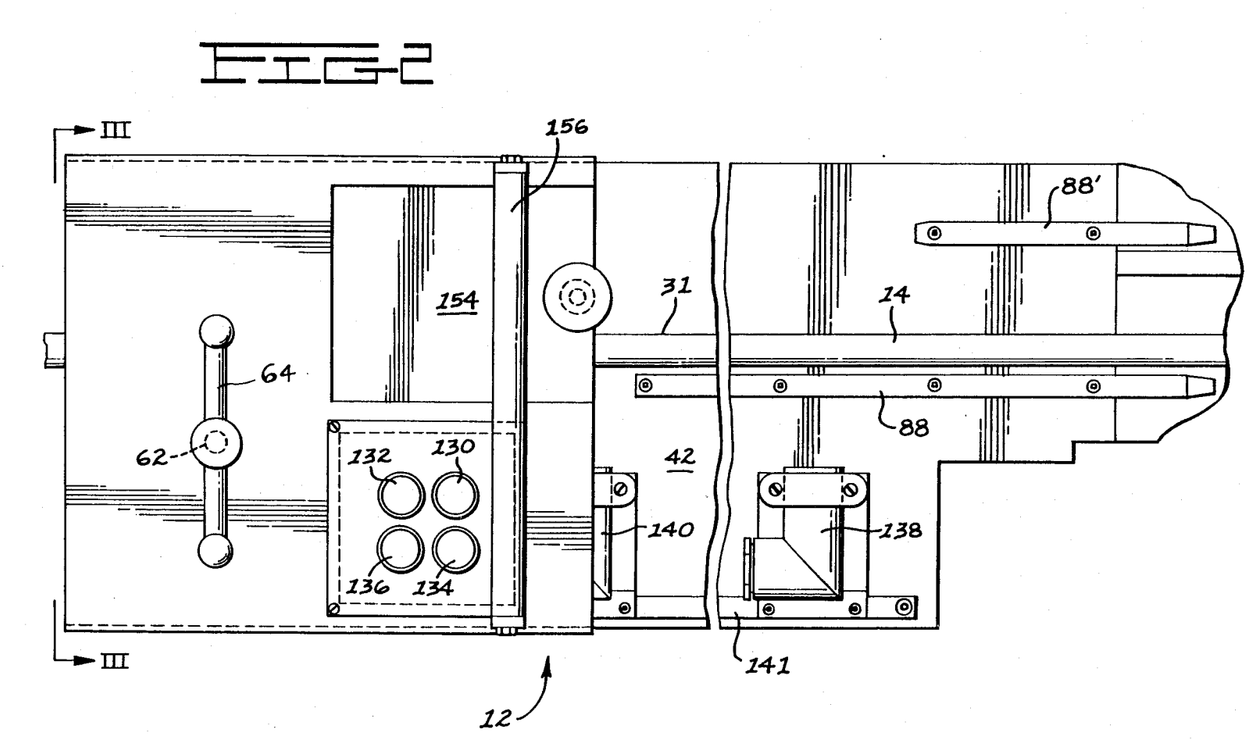
Figure 5:
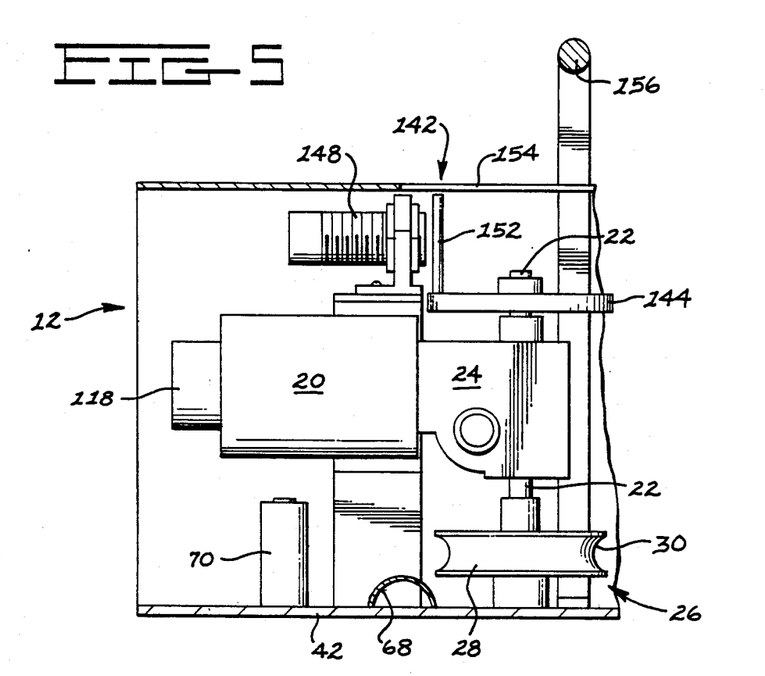
FIG. 5 is a sectional view of the drive assembly taken along the line V—V of FIG. 4 with the welding cable removed for clarity.
Figure 6:
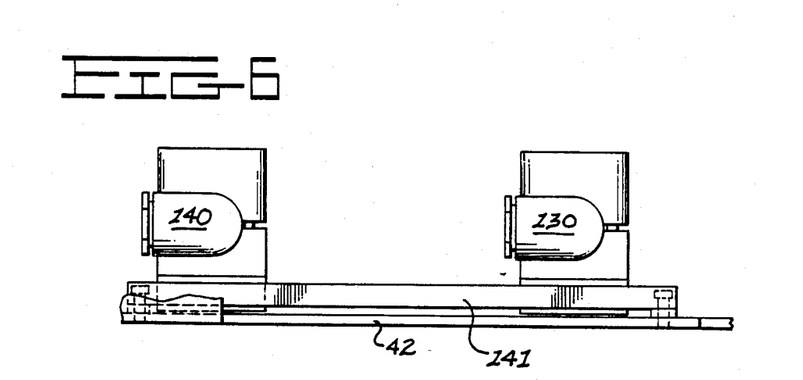
FIG. 6 is an elevational view of a portion of the drive assembly as seen from the line VI—VI of FIG. 4.
Figure 7:
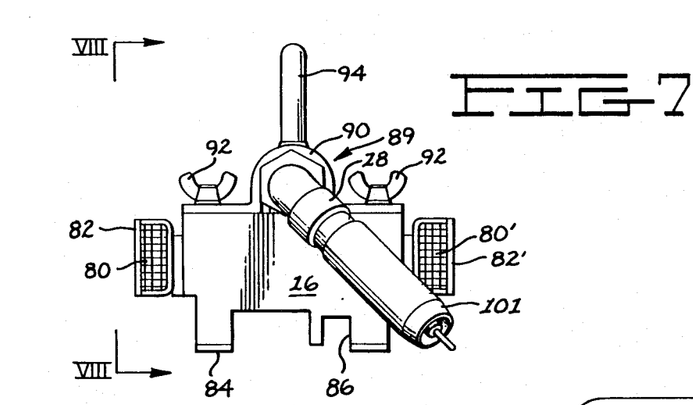
FIG. 7 is an end view of a carriage and nozzle assembly of the welding apparatus.
Figure 8:
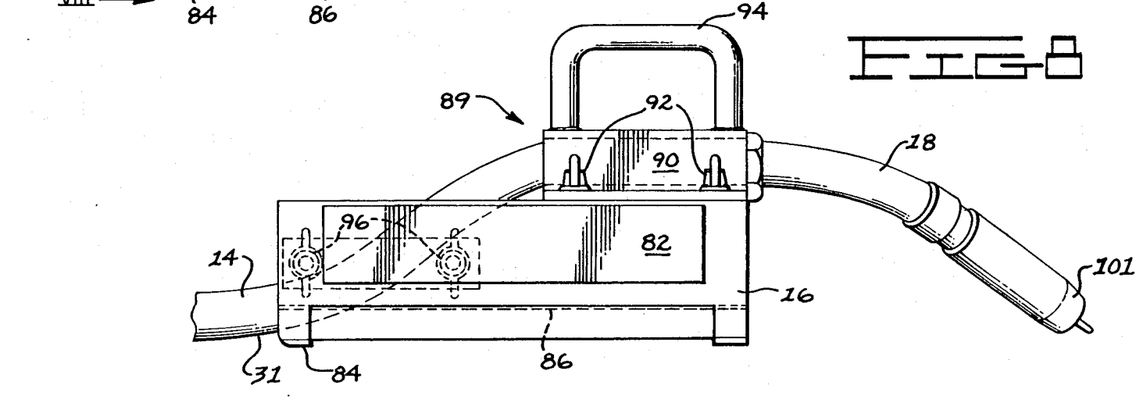
FIG. 8 is a side view of the carriage and nozzle assembly shown in FIG. 7.

An automatic welding apparatus 10 includes a drive assembly 12 for drawing or pulling a welding cable 14 along a predetermined path, and a movable carriage 16 on which a welding nozzle 18 is mounted. The drive assembly 12 includes a motor 20 having a rotatable driven shaft 22. As best shown in FIG. 5, the shaft 22 is a double-ended shaft which is driven by the motor 20 through a double reduction gear box 24. A contact means 26 for engaging the cable 14 includes a welding cable engaging mechanism 28 mounted on the lower end of the shaft 22, and has a peripheral surface 30 that is shaped to complement the outer surface 31 of the welding cable.

Figure 3:
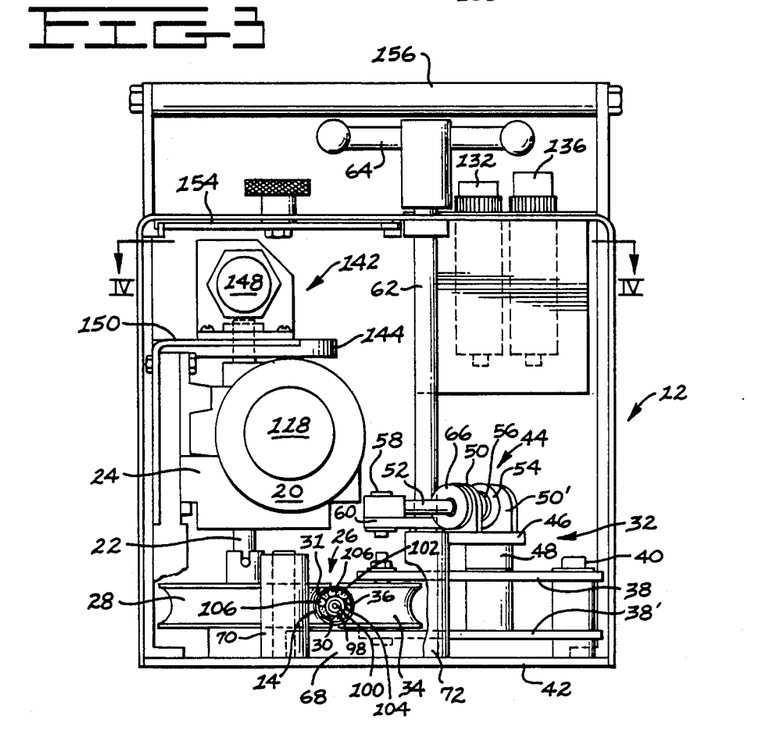
FIG. 3 is an end view of the drive assembly as seen from the lines III—III of FIG. 2.
Figure 4:
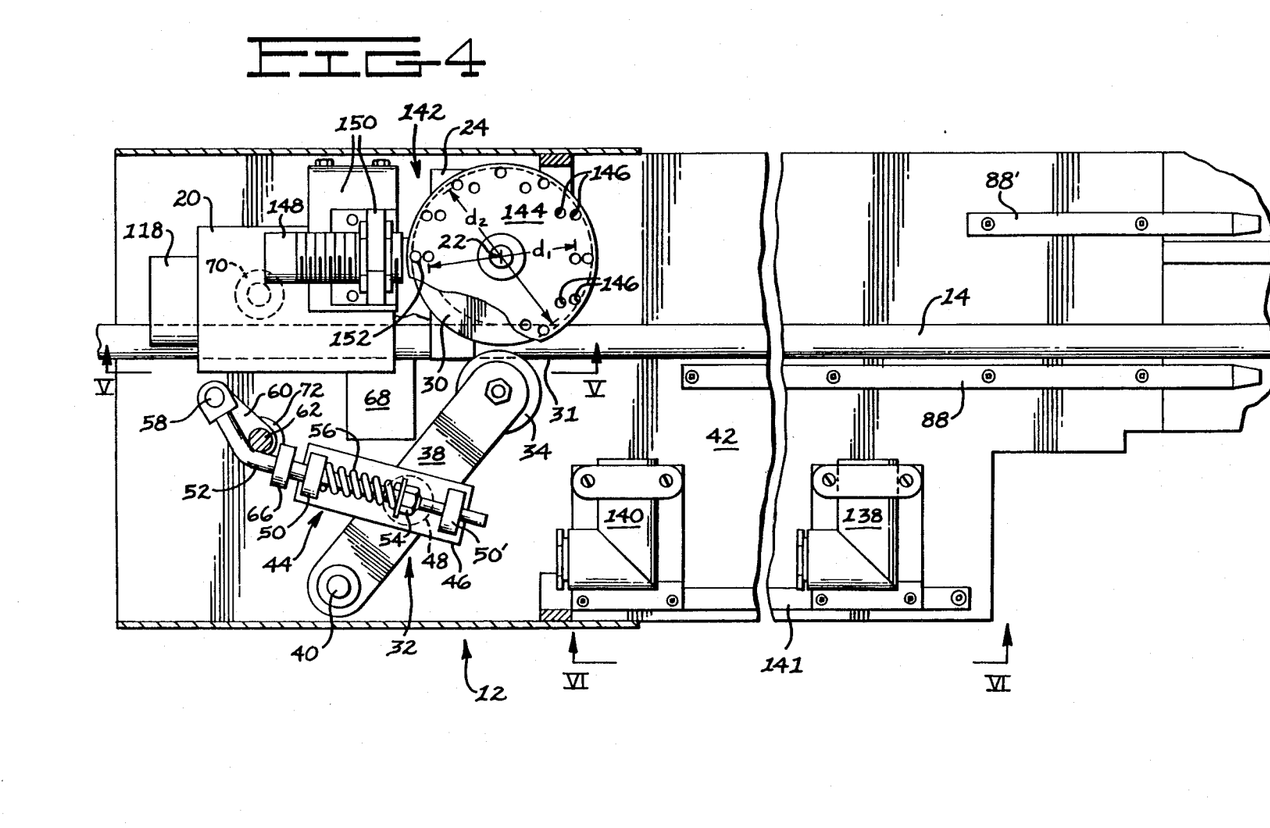
FIG. 4 is a shortened sectional view of the drive assembly taken along the line IV—IV of FIG. 3.

In the preferred embodiment, the drive assembly 12 includes means 32 for urging the cable 14 into pressure contact with the peripheral surface 30 of the welding cable engaging mechanism 28. As shown in FIGS. 3 and 4, the cable urging means 32 includes a rotatable idler pulley 34 having a peripheral surface 36 that is also shaped to complement the outer surface 31 of the welding cable. The idler pulley is rotatably mounted between a pair of arms 38,38' at respective first ends of the arms. The opposite or second ends of the arms 38,38' are pivotally mounted on a sleeved pin 40 that is attached to a base plate 42 of the drive assembly 12. The arms 38,38' pivot about the pin 40 to move the idler pulley 34 between a first position at which the idler pulley is spaced from the cable engaging mechanism 28, and a second position, shown in FIGS. 3 and 4, at which the idler pulley is adjacent the cable engaging mechanism.

At the second position, the idler pulley is biased against the welding cable 14 by an adjustable spring assembly 44. The spring assembly includes a base member 46 pivotally connected to the arms 38,38', by a sleeved pin 48, at a point between the opposed ends of the arms. The base member 46 has a pair of upwardly extending tabs 50,50' which slidably receive a laterally oriented rod 52. A portion of the rod 52 is threaded to receive a nut 54 to adjustably control the compression of a spring 56 positioned on the rod between the nut 54 and the tab 50. An end of the lateral rod 52, spaced from the end extending through the spring assembly, is pivotally connected by a pin 58 to a short lever arm 60 that is fixed to a vertically extending operating rod 62. The operating rod 62 is rotatably mounted on the base plate 42 and extends upwardly through the cover of the drive assembly. A T-shaped handle 64 is fixed to the upper end of the operating rod 62. The lateral rod 52 is bent near the pinned connection end so that when the operating rod 62 is rotated in a clockwise direction, in response to turning the handle 64, the lateral rod 52 is moved past an "over center" position and is locked in the position shown in FIGS. 3 and 4. In this position, the idler pulley 34 is biased by the spring 56 toward the welding cable engaging mechanism 28. The bias force may be adjusted by turning the nut 54 to either increase or decrease the preload on the spring 56. The bias force of the idler pulley 34 against the welding cable 14 should be of a magnitude sufficient to assure a positive, non-slip contact between the cable and the peripheral surface 30 of the cable engaging mechanism. The idler pulley 34 is moved from its biased-contact position with the cable 14 by turning the handle 64 in a counterclockwise position. The movement of the idler wheel away from the cable engaging mechanism 28 is limited by an adjustable stop collar 66 selectively positioned on the lateral rod 52 between the bent portion and the upwardly extending tab 50.

The drive assembly 12 also preferably includes one or more cable guide or support members to aid in directing the welding cable 14 through the drive assembly. In the present embodiment, a horizontally disposed semi-circular split tube 68, a vertically disposed guide roller 70, and a base support 72 for the operating rod 62, are all mounted on the base plate 42 and cooperate to support and guide the welding cable 14 as it passes through the drive assembly.

In FIG. 1, an illustrative example demonstrating one application of the preferred embodiment includes a vertical plate 74 that is to be welded to a horizontal member 76, requiring a fillet weld 78 on each side of vertical plate. In this application, it has been found that a sliding carriage having a magnet 80,80' attached to each side of the carriage is particularly effective in drawing the carriage 16 into contact with the vertical plate and maintaining contact with the plate as the carriage is pulled towards the drive assembly 12. To avoid direct wear on the magnets 80,80', thin non-metallic plates 82,82' are removably attached, such as by screws, over the exposed side surfaces of the magnets. Similarly, a wear plate 84 is removable attached to the bottom surface of the carriage. To reduce friction and wear, the outer surfaces of the wear plates 82,82',84 may be coated with a low-friction material such as polytetrafluoroethylene.

The bottom surface of the carriage 16 has a rectangularly-shaped groove or channel 86 extending the length of the carriage. The channel 86 is positioned so that as the carriage is drawn toward and approaches the drive assembly 12, one of a pair of guide bars 88,88' mounted on the base plate 42 of the drive assembly will enter the channel and guide the carriage onto the base plate. The guide bars 88,88' further serve to elevationally align the base plate 42 with the horizontal workpiece member 76.

The welding nozzle 18 is removably mounted on the carriage 16 by a clamp 90 which engages a portion of the nozzle and holds the nozzle tip securely in a preselected welding position by tightening four wing nuts 92. The clamp 90 may also optionally include a handle 94 for easier postioning of the carriage 16. In welding applications in which vertical clearance is limited, the handle 94 may be omitted. The welding cable 14 is guided through the carriage by a pair of vertically movable rollers 96 and exits the carriage at a position near the workpiece surface to reduce any tendency for the carriage to tip as it is drawn toward the drive assembly 12.

The welding cable 14 is typically a composite assembly containing several smaller wires and a gas line. For example, a cable assembly for a gas metal arc welding torch is shown in section in FIG. 3 and includes a centrally disposed guide 98 for feeding a continuous consumable wire electrode 100 from a source, not shown, to the tip 101 of the nozzle assembly 18. An electrical conductor 102 is enclosed in the cable assembly 14 and provides a flow of current from a conventional controllable welding power source, not shown, to the nozzle assembly. The cable assembly also includes a conduit 104 for providing a flow of shielding gas from a pressurized source to the nozzle assembly. A conventional cable assembly further includes a pair of conductors 106 which are typically connected to a finger-operated trigger switch on the handle of a manually operated nozzle assembly, to permit an operator to selectively operate the arc current, wire feed and gas feeds to the nozzle assembly. In the present embodiment, the handle and switch are omitted from the welding gun assembly and the conductors 106 are connected to an automatically operated switch, as will be explained in more detail, to control arc current, wire and gas feed.

The automatic welding apparatus 10 also includes means 108 for controlling the speed of the motor 20. The control means 108 includes a pair of variable, dial-readout potentiometers 110,112 mounted on a control box 114, a motor control 116 mounted in the control box 114, and a motor-driven tachometer 118 mounted on the motor 20. In the present embodiment, the motor control 116 is a Hampton Vari Speed "160" motor control, produced by Hampton Products Co. Inc., Rockford, Ill., U.S.A. A signal from either one of the speed control potentiometers 110,112, representing a desired motor speed, is directed to the motor control 116. Closed loop control of motor speed is provided by a feedback signal from a tachometer 118 mounted on the motor 20. The motor control 116 compares the actual motor speed signal from the tachometer 118 with the desired motor speed signal from one of the potentiometers 110,112 and accordingly adjusts voltages to the motor 20 so that the actual and desired motor speeds are equal. The control box 114 also has a power on-off switch 120 and an indicator light 122 mounted on the box, a conductor 124 connected to an electrical power source, and a multiple conductor 126 connecting the tachometer 118 and various control switches mounted on the drive apparatus 12 to the control box. Additionally, a conductor 128 is connected to a conventional arc welding controller, not shown, which has separate controls to govern welding voltage and current, wire feed, and shielding gas supply.

Four momentary-contact switches 130,132,134,136 are mounted on the top of the drive assembly 12 to respectively control the start, stop, jog and set functions of the automatic welding apparatus 10. A pair of solid-state electronic proximity switches 138,140 are adjustably mounted on a rail 141 attached to the base plate 42 and positioned parallel to the guide bar 88. The first proximity switch 138 is positioned to sense the approach of the carriage 16 at the end of the weld cycle. The second proximity switch 140 is positioned to sense the approach of the carriage 16 towards a stop position at which the carriage rests fully on the base plate 42. The operation of the automatic welding apparatus 10 and the control functions of the above mentioned and other switches will be fully explained below with reference to the electrical circuit diagram shown in FIG. 9.

The welding apparatus 10 also includes means 142 for selectively interrupting the flow of current to the welding nozzle assembly 18 in response to angular rotation of the output shaft 22 of the motor 20. An annular disk 144 having a plurality of threaded holes 146 circumferentially spaced around the disk at a first diameter $d_1$ and a second diameter $d_2$, is mounted on the upper end of the output shaft 22 and rotates simultaneously with the welding cable engaging mechanism 28. The outer circle of threaded holes $d_2$ are advantageously spaced such that the distance between adjacent holes is equivalent to 1.0 inch (2.5 cm) of travel of the peripheral surface 30 on the welding cable engaging mechanism 30. The welding cable 14 is drawn through the drive assembly 12 at the same rate as the peripheral surface 30 travel rate, and therefore, the spacing of the holes 146 in the outer circle $d_2$ is equivalent to 1.0 inch of travel of the welding cable 14. Similarly, the hole spacing of the inner circle $d_1$ is equivalent to 3.0 cm (1.2 inches) of travel of the welding cable. A proximity switch 148 is adjustably mounted above the motor 20 on a bracket 150 so that the switch senses the singular presence of one or more pins 152 which may be threaded into corresponding preselected holes 146.

The pins 152 may be inserted in a preselected one or more of the 12 holes of the outer circle so that the proximity switch 148 senses the presence of a pin 152 in as small as 1.0 inch increments of welding cable travel. That is, if the outer hole circle $d_2$ has only one pin, the switch 148 will sense the presence of a pin 152 once each revolution of the disk which, for the outer circle is equal to 12 inches of welding cable travel. If two pins are used, a pin will be sensed each one-half revolution or every 6 inches of cable travel. Similarly three equidistantly spaced pins will produce a signal every 4 inches of cable travel and 4 pins will produce a signal for every 3 inches of cable travel. Twelve pins will produce a signal from the proximity switch for every 1 inch of cable travel. If it is desired to work in the metric system, the proximity switch 148 may be adjusted to sense the presence of pins 152 threaded into one or more of the 10 holes in the inner circle $d_1$ and hence provide a signal in response to 3 cm multiples of welding cable travel. A removable panel 154 is provided in the top of the drive assembly 12 to provide access for the installation and removal of the pins 152 and adjustment of the proximity switch 148. A carrying handle 156 is secured to the base plate 42 and extends above the drive assembly so that the assembly may be easily transported between job sites.

Turning now to an illustrative use of the above-described automatic welding apparatus 10, assume it is desired to form a non-continuous fillet weld along a joint between two plates which are at right angles with respect to each other as shown in FIG. 1. Further, assume it is desired to form the fillet weld in 6 inch (15.2 cm) lengths, with a space of 6 inches (15.2 cm) along the joint between each of the welds. Two pins 152 are therefore inserted into two respective equidistantly spaced holes 146 in the outer circle of threaded holes 146 formed in the annular disk 144. Next, the T-shaped handle 64 is turned in a counterclockwise direction to move the idler pulley 34 to a first position away from the welding cable engaging mechanism 28 and provide sufficient clearance to freely pull the welding cable 14 through the drive assembly 12. The carriage 16, with the nozzle assembly 18 mounted thereon and the cable 14 attached to the nozzle, is placed on the workpiece 76 at the weld position farthest from the drive unit. The wear-protecting plate 82, mounted on the carriage 16, should abut the vertical workpiece member 74, and the nozzle 18 is adjusted so that the tip of the nozzle is in the desired welding position at the joint between the two members to be welded.

After mechanically positioning and adjusting the carriage 16 and nozzle assembly 18, the on-off switch 120 is placed in the "on" position and the "set" switch 136 on the drive assembly 12 is closed by pressing. All of the following control relays and their corresponding contacts may be hard-wired and mounted in the control box 114. Alternatively the below-described circuit components may be included in a programmable controller such as an Allen-Bradley SLC 100 programmable controller produced by Allen-Bradley Company, Milwaukee, Wis., U.S.A.

Figure 9:
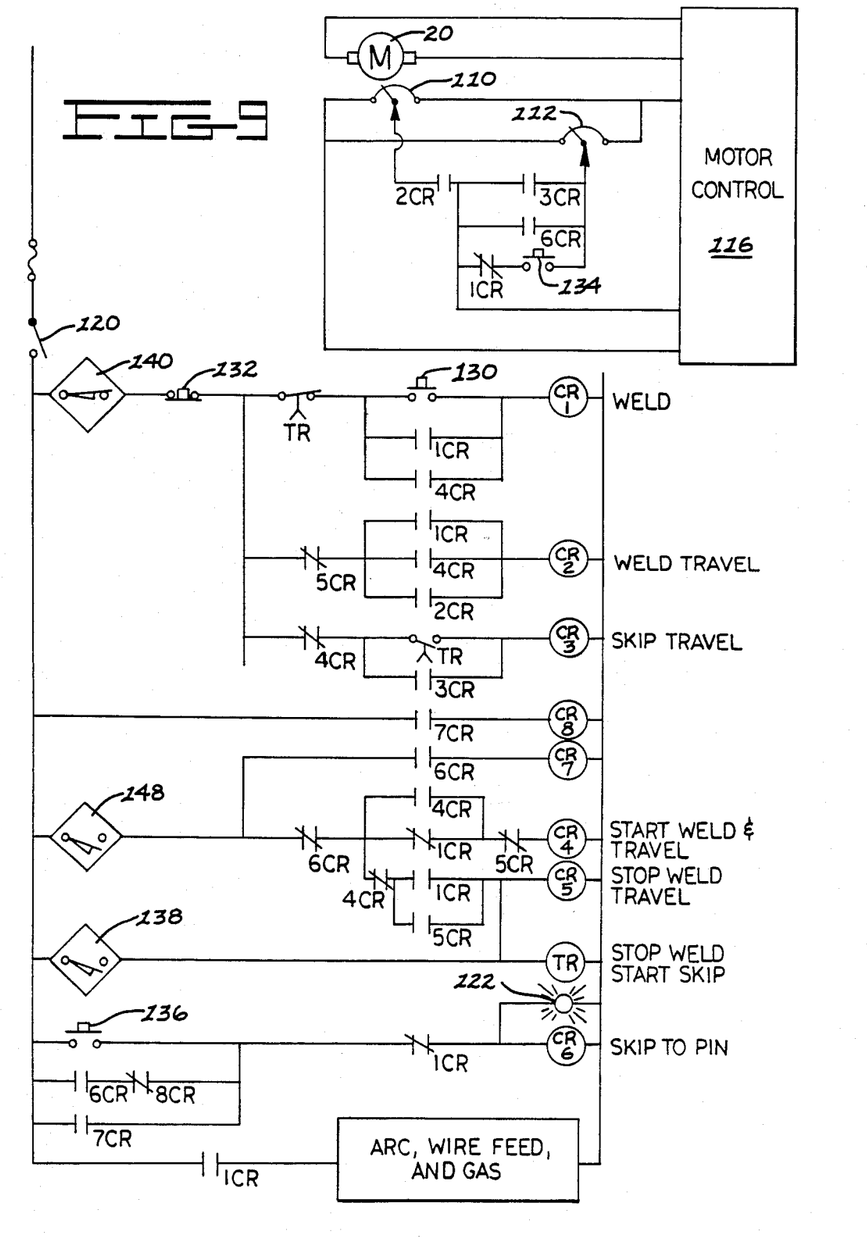
FIG. 9 is a schematic electrical diagram for the automatic welding apparatus.

As shown in FIG. 9, closing switch 136 provides power through a normally closed contact 1CR to a control relay, designated as CR6, and to the control box-mounted indicator light 122. In response to being energized, CR6 closes a normally open contact 6CR providing a continued source of power through a normally closed contact 8CR after the set switch 136 is released. Control relay CR6 also closes a normally open contact 6CR in the motor control circuit to drive the motor 20 at a speed determined by the value set on the dial readout potentiometer 112. In this example, potentiometer 112 will be used to control the skip travel speed of the carriage and will have a higher value than potentiometer 110 which will be set to control the travel speed of the carriage during the welding portion of the operation. Typical values for skip travel speed are on the order of about 7 to 8 feet per minute (3.6–4.1 cm/s) and for weld travel speed, about 1 to 2 feet per minute (0.5–1.0 cm/s).

Operation of the motor 20 will rotate the annular disk 144 and bring one of the pins 152 into the field of proximity switch 148. This action closes the contacts on the normally-open proximity switch and directs power to control relay CR7 through 6CR which is closed as a result of energizing CR6. Energizing CR7 closes two normally open contacts 7CR and provides power to control relay CR8 and continued power to CR6 after normally closed 8CR in the previous CR6 supply circuit opens as a result of providing power to 8CR. During this sequence 6CR in the motor circuit remains closed and the motor continues to operate at skip speed. As the disk 144 continues its rotation, the previously sensed pin 152 will leave the sensed field of proximity switch 148 and the switch contacts will open. This action interrupts power to CR7, causing the two 7CR contacts to open and interrupt power to CR6 and CR8. The contact 6CR in the motor circuit returns to its normally open position, stopping the motor 20. Also, indicator light 122 is turned off signaling that the respective pin and proximity switch positions are now properly aligned to begin the automatic welding cycle.

During the above "set" operation, the welding cable 14 is only loosely positioned between the cable engaging mechanism 28 and the idler pulley 34. Accordingly, the cable engaging mechanism is free to rotate without affecting the position of the cable and attached nozzle and carriage. To engage the welding cable 14 with the cable engaging mechanism 28, the T-handle 64 is turned in a clockwise direction, bringing the lateral rod 52 past the over-center position and locking the spring assembly 44 in a second position, shown in FIGS. 3 and 4. At the second position, the idler pulley 34 is adjacent the cable engaging mechanism and is also biased against the welding cable 14 and maintains a continual force on the cable to urge it into driving contact with the peripheral surface 30 of the welding cable engaging mechanism.

To begin the automatic welding cycle, the only action required by the operator, after the initial set up and adjustment described above, is to push the start switch 130 mounted on the drive assembly 12. Closing the start switch 130 will provide a flow of current to control relay CR1 through proximity switch 140, stop switch 132, and a time delay contact switch, all of which are in series connection and normally closed. Energizing CR1 closes a contact 1CR in parallel with the start switch to lock in the power supply circuit to CR1 after the start switch is released. Also CR1 closes a contact 1CR in parallel with the 1CR contacts in the power supply circuit and locks in the power supply to CR2. Control relay 2 also closes a normally open contact 2CR in the motor control circuit to drive the motor 20 at a speed designated by the value set on the weld speed dial-readout potentiometer 110. The motor will rotate the weld cable engaging mechanism 28 in a clockwise direction, as viewed in FIG. 4, and draw the weld cable through the drive assembly 12. This action will cause the carriage 16 and carriage-mounted nozzle assembly 18 to be drawn toward the drive assembly 12. The magnet 80 will continuously pull the carriage into contact with the vertical plate 74 and assure that contact is maintained as the carriage is drawn toward the drive assembly.

Simultaneously with the energizing of the power circuit to CR2, and the start of weld travel, CR1 also closes a normally open contact 1CR to provide power to the arc, wire feed, and gas supply controllers to supply welding current, consumable electrode wire feed, and shielding gas supply to the nozzle tip. Also, for reasons which will become apparent, CR1 opens a normally closed contact 1CR in the power supply circuit to control relay CR4, closes a normally open contact in the power supply circuit to control relay CR5 and opens a normally closed contact 1CR in the power supply circuit to CR6.

The welding cycle will continue as the carriage 16 and nozzle assembly 18 are drawn towards the drive assembly 12. After travel along the weld joint and forming a continuous fillet weld 78 for the desired 6 inch (15.2 cm) length, one of the pins 152 previously positioned on the disk 144, will enter the field of proximity switch 148 causing the contacts of the switch to close, providing current flow to CR5 and a time delay relay TR through closed contacts 6CR, 4CR, and 1CR. Energizing CR5 closes a normally open contact 5CR in parallel with 1CR in the power supply circuit to CR5 and TR to lock in the power supply circuit to these relays when 1CR drops out. Also, CR5 opens the normally closed contact 5CR in the power supply circuit to CR2, which interrupts power to CR2 causing 2CR in the motor control circuit to open and the motor 20 to stop. This causes the carriage travel to stop but welding continue and thereby permit the crater in the weld puddle to fill prior to advancing into the skip mode.

The delay in stopping the welding operation to allow crater fill is provided through the circuits controlled by the adjustable time delay relay TR. After a preselected time which typically for an 8.0 mm fillet weld is about 0.9 seconds, the coil is energized, normally closed contacts TR in the power supply to CR1 open, and normally open contacts TR in the power supply circuit to control relay CR3 close. With the interruption of power to CR1, the relay is de-energized and all of the contacts controlled by CR1 return to their normal position. In particular, 1CR in the control circuit to the arc, wire feed and gas supply opens and welding stops.

Closing of the contacts TR in the power supply circuit to CR3 energizes CR3 through normally closed 4CR. This causes normally open contacts 3CR, in parallel with TR, to close and thereby lock in the power supply to CR3 after TR returns to its normally-open position. Also, normally open contact 3CR in the motor control circuit closes and the motor is driven at skip speed through potentiometer 112, moving the carriage 16 toward the drive unit 12 at the previously determined faster rate. Shortly after entering the skip mode, the pin 152 will leave the sensed field of proximity switch 148 and the switch contacts will open. As a result, relays CR5 and TR will be de-energized and the contacts controlled by these relays will return to their respective normal positions.

After the carriage travels the predetermined skip distance, selected in this example to be 6 inches (15.2 cm), one of the pins 152 will again enter the sensed field of the proximity switch 148 and the contacts of the switch will close. The closing of the contacts on switch 148 when the apparatus is in the skip mode will initiate a sequence of events which will return the welding apparatus to the previously described welding mode. First, control relay 4 (CR4) is energized through normally closed contacts 6CR, 1CR and 5CR. Energizing CR4 closes a normally open contact 4CR in parallel with 1CR in the power supply circuit to provide CR4 with power with 1CR open. Energizing CR4 also simultaneously opens the normally closed contact 4CR in the power supply to CR3, de-energizing CR3, and closes contacts in the power supply circuits to CR1 and CR2, thereby energizing these two control relays. De-energizing CR3 causes 3CR in the motor circuit to return to its normally open position, stopping power to the motor 20. Energizing CR1 closes the contact 1CR which is in parallel with 4CR in the power supply circuit to CR1, closes the contact 1CR in the power supply circuit to CR2, and closes the contact 1CR in the arc, wire feed and gas supply control circuit thereby initiating start of welding action at the nozzle 18. Travel of the carriage 16 along the joint at the preselected weld travel rate set on potentiometer 110 is provided as a result of energizing CR2 and the resultant closing of contact 2CR in the motor circuit.

Shortly after re-entering the weld mode, the pin 142 will rotate out of the sensed field of proximity switch 148 and the switch contacts will open thereby de-energizing CR4. Control relays 1 and 2 will remain energized as a result of the lock-in features in each of the power supply circuits. The weld cycle will continue until one of the pins 152 again enters the field of proximity switch 148, first stopping weld travel, and then after a delay for crater fill, stopping the weld operation in the manner described above prior to entering the skip mode.

The carriage 16 is continuously drawn towards the drive unit 12, and the above described weld and skip cycles are automatically repeated until the weld nozzle 18 approaches the end of the weld joint adjacent the drive unit. At this point the first proximity switch 138, adjustably mounted on the base plate 42, senses the presence of the carriage 16 and the switch contacts close energizing relays TR and CR5. Control relay 5 opens the contacts 5CR in the power supply circuit to CR2, thus de-energizing CR2 and, if the apparatus is then operating in the weld cycle, will return contacts 2CR in the motor control circuit to the open position. This action will stop weld travel and permit the crater to fill in the previously-described manner. After a short time delay, determined by relay TR, the relay-controlled contacts TR in the power supply circuit to CR1 open and all of the contacts controlled by CR1 return to their respective normal positions. Thus arc current, wire and gas feeds stop and welding ceases. The time delay relay TR also closes the contacts TR in the power supply circuit to CR3. As previously described, the motor 20 will now operate at skip speed to withdraw the carriage 16 and nozzle assembly 18 onto the base plate 42, being guided onto the base plate by the guide bar 88. After the carriage is drawn fully onto the base plate, the second proximity switch 140 senses the presence of the carriage and the switch contacts open. This action interrupts power to the power supply circuits for CR1, CR2, and CR3, effectively stopping the motor 20 and preventing operation of any of the weld, weld travel, or skip travel circuits.

If it is desired to move the motor or carriage at some time other than when welding, the jog switch 134 mounted on the drive assembly may be depressed and the motor 20 will operate at the skip speed rate set on potentiometer 112. Should it be necesary to stop the unit at any time during the welding operation, depressing the stop switch 132 mounted on the drive assembly will interrupt power to the weld, weld travel and skip travel circuits.

For continuous welding applications, it is advantageous to render the current interrupting means 142 inoperative. In the disclosed embodiment this may be accomplished by omitting the pins 152. Without the presence of pins, the automatic welding apparatus 10 will remain in the weld mode until it reaches the end of the weld groove and the presence of the carriage 16 is sensed by the first proximity switch 138. To achieve the same function switch 138 may be removed from operation by installing an on-off switch in series with it.

INDUSTRIAL APPLICABILITY

The portable automatic welder apparatus 10 of the present invention is particularly useful in welding applications in which access to the weld joint is limited. It is now possible to automatically lay down a full penetration internal weld on a workpiece assembly having only 2.5 inches (6.35 cm) vertical clearance. Similarly, full penetration internal welding has been demonstrated on an assembly having a width clearance of only 1.75 inches (4.4 cm).

Additionally, the welding process, either in the continuous or skip mode, is fully automatic. After the carriage 16 and nozzle assembly are positioned and the start button engaged, the apparatus will weld without an operator's attention. It is thus very practical for a single operator to run several of the automatic welders simultaneously. The apparatus is portable, requires no fixed installation, and can be easily moved from job to job. Also, it is inexpensive, simple to operate, and can obtain a high quality weld without continuous operator supervision.

A welding method includes the steps of mounting the nozzle assembly 18 on the carrier 16 in a position such that the nozzle tip 101 is in a welding position, positioning the carrier adjacent a joint to be welded, and then moving the carrier and the welding nozzle along that joint. In accordance with the present invention the movement is accomplished by pulling the welding cable attached to the nozzle in a direction substantially parallel to the joint. If it is desired to form a non-continuous or skip weld along the joint, the method also includes the step of selectively alternately interrupting and restoring the source of electrical current and wire feed to the nozzle tip. When operating in skip weld applications, if is contemplated that the carrier advantageously moves at a faster speed when not welding than when welding is being performed.

In addition to the gas metal arc welding application described above, the present invention is also readily adaptable to most arc welding operations such as shielded-metal arc welding, flux-cored arc welding, gas tungsten arc welding and with additional modification to submerged arc welding.

Also, depending on the application, other carriage configurations may be appropriate. For example, if a fillet weld is to be formed between two workpieces tilted at an angle to the horizontal, a simple sheet metal guide with a clamp for the nozzle may be all that is required for a support carriage. In such an application, gravity would keep the carriage in the weld groove. In other applications, it may be desirable to substitute magnetic wheels for the bar magnets 80,80'. Thus, it should be recognized that the primary function of carriage 16 is to support nozzle 18 for movement along a weld groove, and the particular shape and configuration of the carriage will be dependent on the application in which it is to be used.

Other aspects, objects and advantages of this invention can be obtained from a study of the drawings, the disclosure and the appended claims.

I claim:

1. A drive assembly for moving a welding nozzle along a predetermined path, said welding nozzle being connected at one end to a welding cable which has an outer surface and an internally positioned electrical conductor extending between a source of electrical current and the nozzle assembly, said drive assembly comprising:

a motor, a driven shaft operatively connected to the motor, means for selectively interrupting and restoring the flow of current from said source to said nozzle assembly in response to angular rotation of the drive shaft, a welding cable engaging mechanism operatively driven by the motor and having peripheral surface complementary to the outer surface of said welding cable, means for operatively controlling and selectively varying the speed of said welding cable engaging mechanism during a welding operation, and means for urging the welding cable into pressure contact with the peripheral surface of said welding cable engaging mechanism.

2. A drive assembly, as set forth in claim 1, wherein said means for urging the cable into pressure contact with the welding cable engaging mechanism includes a rotatable idler pulley having a peripheral surface for engaging the outer surface of the welding cable, said idler pulley being movable between a first position at which the idler pulley is spaced from the cable engaging mechanism and a second position at which the idler pulley is adjacent the cable engaging mechanism and is biased against a portion of the welding cable when said cable is interposed the respective peripheral surfaces of the cable engaging mechanism and the idler pulley.

3. A drive assembly, as set forth in claim 1, wherein said means for selectively interrupting and restoring the flow of current includes an annular disk mounted on the driven shaft, at least one elongated pin having a threaded end, a plurality of circumferentially spaced threaded holes formed in a planar surface of the disk and adapted to receive the threaded end of said pin, and a switch mounted adjacent the disk and positioned to sense the presence of said pin when the pin is adjacent the switch.

4. A drive assembly, as set forth in claim 1, wherein said means for operatively controlling and selectively varying the speed of said welding cable engaging mechanism controls the welding cable engaging mechanism at a first preselected speed when current is flowing between the source and said nozzle assembly and at a second preselected speed when the current flow between said source and the nozzle assembly is interrupted.

5. A welding apparatus for controllably moving a welding nozzle having a welding cable attached to an end of the nozzle, the apparatus comprising:

a movable drawn carriage, means for mounting the welding nozzle on the carriage, means for pulling the cable along a predetermined path to move said carriage in a direction substantially parallel to said path, and means for selectively interrupting and restoring a flow of current to said welding nozzle at a rate correlative to the rate of movement of the carriage along said predetermined path.

6. A welding apparatus, as set forth in claim 5, wherein the means for pulling the cable includes a motor operatively connected to a driven shaft, a welding cable engaging mechanism mounted on said driven shaft, and means for urging the cable into pressure contact with the cable engaging mechanism.

7. A welding apparatus, as set forth in claim 5, including means for operatively controlling the speed of said cable pulling means to vary the rate of movement of said carriage along said predetermined path.

8. In a welding apparatus including a welding nozzle having a tip, a cable attached to the nozzle and a movable carriage on which the nozzle is mounted, the improvement comprising:

a drive assembly for drawing the carriage and nozzle by pulling the cable, the assembly including: contact means for engaging the cable, means for moving the contact means to move the cable relative to the assembly, and means for selectively interrupting and restoring a flow of current to said welding nozzle, and means for operating said last-mentioned means correlative to the rate of movement of the cable.

9. A welding apparatus, as set forth in claim 8, wherein said contact means includes a welding cable engaging mechanism and means for urging the cable into pressure contact with the welding cable engaging mechanism.

10. A welding apparatus, as set forth in claim 9, wherein said means for urging the cable into pressure contact with the welding cable engaging mechanism includes an idler pulley mounted on a pair of arms, and an adjustable spring assembly operatively connected to said pair of arms.

11. A method of welding using a welding nozzle having an attached weld cable for feeding electric current and at least one of welding wire and gas to the nozzle, including the steps of:

mounting the weld nozzle on a carriage that holds the nozzle with its tip in a welding position, positioning the carriage adjacent a joint to be welded, pulling the cable and thereby moving the attached nozzle and the carriage on which said nozzle is mounted in a direction substantially parallel to said joint at a first preselected rate during the feeding of a supply of electric current and at least one of welding wire and gas to the welding nozzle, and moving the nozzle and the carriage along the joint at a second preselected rate when the feeding step is interrupted, said second preselected rate being a higher rate than the first preselected rate, controllably feeding and selectively interrupting a supply of electric current and at least one of welding wire and gas to the welding nozzle, and, selectively restoring the supply of electric current and at least one of welding wire and gas to the welding nozzle after interrupting said supply, and selectively varying the rate of movement of the nozzle and the carriage.

* * * * *